W. H. MUZZY.
GASOLINE RESERVE AND CONTROL DEVICE FOR AUTOMOBILES.
APPLICATION FILED JAN. 30, 1920.
1,407,799.
Patented Feb. 28, 1922.
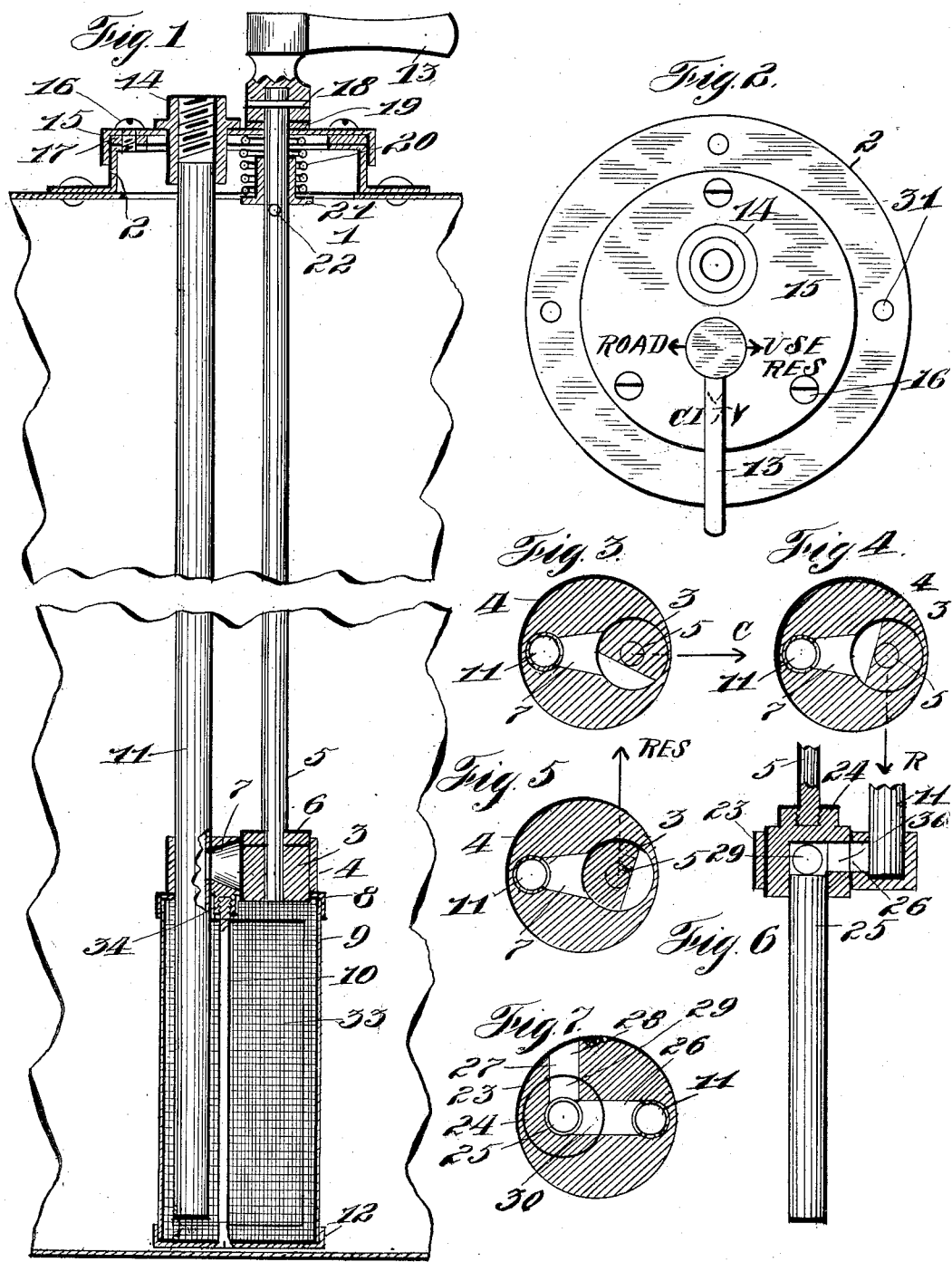

UNITED STATES PATENT OFFICE.

WILLIAM H. MUZZY, OF CHICAGO, ILLINOIS.

GASOLINE RESERVE AND CONTROL DEVICE FOR AUTOMOBILES.

1,407,799.  Specification of Letters Patent.  Patented Feb. 28, 1922.

Application filed January 30, 1920. Serial No. 355,161.

*To all whom it may concern:*

Be it known that I, WILLIAM H. MUZZY, a citizen of the United States, residing at Chicago, in the county of Cook and State of Illinois, have invented certain new and useful Improvements in Gasoline Reserve and Control Devices for Automobiles, of which I declare the following to be a full, clear, and exact description.

This invention relates to improvements in reserve and control devices for the fuel tanks of automobiles and the like and has more particular relation to improvements in such devices for eliminating all constructions that are subject to wear or leakage of the gasoline or fuel because of wear, or that are subject to "freezing" or becoming inoperative because of the corrosive action of the gasoline on close working parts.

The principal object of the invention is to provide a reserve device that is positive in its operation but is so constructed that the controlling part which determines whether the reserve supply is used or not, may be made very loose and free in its operation so that it will not become "frozen" because of corrosion, non-use, collection of the byproducts of the oil such as gum or tar, collection of dirt or from any of the other numerous causes that render close fitting parts inoperative when allowed to stand practically submerged in and subject to the destructive action of the liquid fuel.

A further object of the invention is to provide an improved reserve device for reserving different amounts of fuel at will according to the situation in which the automobile is being operated and its distance from a source of fuel supply, as for instance, use on a country road or use in the city.

A still further object of the invention is to provide a device of the class mentioned with an improved form of strainer.

Another object of the invention is to provide a device of the class mentioned with means for turning off the gasoline completely at the tank.

Another object of the invention is to provide a device of the class mentioned which will not leak gasoline or allow the gasoline to escape from the main tank.

The invention also has other objects all of which will be hereinafter more particularly set forth and claimed.

In the accompanying drawings which form part of this specification;

Figure 1 represents a detail vertical section of the device embodying my invention applied to a gasoline tank the latter being broken away;

Figure 2 represents a top plan view of my said device detached from the gasoline tank;

Figure 3 represents a detail horizontal section of the valve and its casing, the former being in a position for the reserve of the minimum amount of gasoline;

Figure 4 represents a similar view with the valve in the position that reserves the maximum amount;

Figure 5 represents a similar view with the valve in the position to which it is adjusted when the reserved amount is to be used;

Figure 6 represents a detail vertical section of a modified form of valve, casing and connected parts for use where it is desired to cut off the gasoline at the tank under certain conditions; and Figure 7 represents a detail horizontal view of the valve and casing shown in Figure 6.

Described in general terms the devices are of a somewhat similar nature to the devices shown in my co-pending application No. 342,077, filed Dec. 3rd, 1919, and may be said to consist of a fuel feed pipe that projects down into the tank of the automobile at the rear of the machine and is connected to the suction feed pipe of a so called "vacuum system" for feeding the fuel to the carburetter of the engine. This pipe is provided at the proper level within the tank with an air vent for overcoming the suction when the liquid in the tank uncovers this vent and a proper valve for closing this vent to re-establish the suction and cause the reserve amount of the fuel to become available for use through the same feed pipe. As this air vent when fully opened allows a definite amount of air to enter the main feed pipe at this point so it follows that when the vent is partly closed a less amount of air may enter and more gasoline drawn out of the tank before the suction is overcome sufficiently to prevent any further feed of the fuel. By closing the air vent more or less any desired amount may be retained in the tank as a reserve, that is any amount that might be accommodated below the air vent.

In the drawings 1 represents the main gasoline tank of the machine which is located at the back of the machine, 11 the main feed pipe which is suitably connected at its upper end to the main feed line of the machine. This pipe 11 is rigidly mounted in a sleeve 14 which is brazed or otherwise set in the cap 15 which is stamped out of sheet metal. This cap is detachably connected to the tank by screws 16 which screw into part of the ring 2 which is suitably brazed and riveted to the top of the tank over an opening formed in the tank. A fibre washer 17 is interposed between the cap 15 and the ring 2 to form a liquid tight joint at this point but it will be seen that this cap might screw onto the ring 2 if desired.

The operating handle 13 is secured by a pin 18 to the top of a rod 5 which passes through the cap 15 and is drawn downward upon a fibre washer 19 by a coil spring 20 which is interposed between the under side of the cap and a flanged sleeve 21 which surrounds the rod and is supported by a pin 22 passing through the rod. The spring 20 draws the hub of the handle 13 down tight against the washer 19 which in turn is forced tight against the cap 15 and a liquid tight joint thus formed at this point. The spring 20 has the added function of creating sufficient friction against movement on the part of the handle 13 to secure the latter firmly in position and yet allow it to be moved readily at will. This prevents the handle from moving out of its set position because of vibration.

The lower end of the rod 5 carries the cylindrical valve 3 fast thereon. This valve has a straight cut taken off one side as shown and extending its entire height. A cap washer 6 is placed above the valve on the rod 5 making the valve cylindrical at the top but it will be understood that the valve may be cut in such a way as to have the washer formed as an integral part of the valve.

The valve 3 is loosely mounted in a valve casing 4 so as allow plenty of clearance to prevent any binding of the valve in the casing even after the valve becomes corroded by the action of the gasoline. The casing 4 is secured on the pipe 11 and is bored horizontally with a tapered bore as at 7 to bring the bore which accommodates the valve 3 into communication with the interior of the pipe 11, the bore extending through the wall of the pipe as shown. It will be seen that the rod 5 is free to move vertically under the stress of the spring 20 and that the valve 3 is so mounted in its casing that any slight vertical movement either up or down will have no effect upon its operation as it practically has no vertical seat. It will be understood that the washer 6 may be omitted if desired when the screen 33 is not used, its only function being to prevent dirt entering at this point which is not screen protected.

The screen 33 of wire mesh is cylindrical in form and is supported in a light frame 9 of metal having a lower solid base 12 and an upper ring 8, all preferably soldered together so that it may be removed as a unit for cleaning. This screen is held in position with the ring 8 against the under side of the valve casing 4 by a screw bolt 10 which passes through the base 12 and screws into a lug 34 pendant from the casing 4.

In the operation of the devices above described when the handle 13 is adjusted to the position shown in Figure 2, the valve 3 is turned as shown in Figure 3 (see arrow) and the vent port 7 is half closed. This position is for city driving where the points of gasoline supply are close at hand. In this position only half the usual amount of air may enter the pipe 11 through the passage 7 and the difference in suction in the pipe 11 will cause the gasoline to be lowered in the tank to a point somewhat below the air vent in the pipe before the flow of fuel will cease. When the handle is adjusted to the road position where the sources of fuel supply are further away a greater amount of the fuel will be retained as a reserve when the feed pipe stops feeding gasoline. In this position shown in Figure 4, the port 7 is fully open and the full quantity of air enters the pipe 11 at this point and stops the flow shortly after this level is reached. These amounts of gasoline may be adjusted so as to retain two gallons for the city reserve and four gallons for the country reserve or any other amounts desired.

It will also be seen that any gasoline entering the pipe 11 either at the end or at the air vent will first have to pass through the screen and any dirt or water will thus be caught by the screen. Further any dirt caught by the screen is constantly washed from it by the surge of the gasoline in the tank.

Setting the handle 13 for either country or city driving has a further function which is of some little importance when the nature of different roads is considered. Any reserve device which might reserve a certain amount of gasoline when the car was standing still or passing over smooth pavements of a city would be more or less uncertain as to the amount reserved when passing over rough country roads which cause the gasoline in the tank to surge back and forth and assume different levels in different parts of the tank while the machine is in operation. The city reserve would therefore be cut down in the country just where a full reserve or an increased reserve is desired. With the present devices this automatically takes care of itself by the setting of the handle 13 as when the handle is turned to country or road riding the amount of the reserve is increased sufficiently to take care of what might be termed "splash feeding" after the reserve point is reached.

It will of course be understood that the handle may be adjusted to open the air vent more or less and thus retain any desired amount of reserve within the compass of the machine.

In the modified form of my devices shown in Figures 6 and 7 I make provision for the reserve and also for turning off the gasoline by the same valve that controls the reserve. In this form of my invention the feed pipe 11 terminates in the casing 23 and the valve 24 which is carried by the rod 5 also carries the extension pipe 25 which constitutes the reserve portion of the device. This pipe 25 communicates with the pipe 11 by passage 30 in the valve and passage 26 in the casing, and the pipe 11 communicates with the passage 28 of the casing 23 by passages 26 and 30 and passage 29 also formed in the valve. When the valve is in the position shown in Figure 7 the feed of the gasoline will stop when the level of the opening 28 is reached and air enters at this point to overcome the suction in the same manner as before described. When the valve is moved one quarter revolution to the right the passage 28 will be closed but the pipe 25 will still remain in communication with the pipe 11 and the reserve will be drawn on. A further one quarter movement to the right of the valve will close both passages 28 and 26 and the gasoline will be turned off at the tank whether a suction or a pressure system is being employed in connection with the feed of the gasoline. Such turn off devices are particularly desirable however in connection with pressure feed systems to prevent the gasoline leaking from the carburetter or other parts after the machine has come to rest and while pressure still remains on the gasoline tank.

It will be understood from the foregoing that with the present devices all danger of the parts becoming "frozen" by not being used and by the collection of gum or corrosion from the gasoline has been obviated and the valve 3 so loosely mounted in its casing that the collection of even an unusual amount of corrosion will have no effect whatever upon the free operation of the devices and upon this one feature alone a great advantage is claimed by giving a perfect control of the reserve without any of the attendant close fitting and air tight joints usually necessary in devices of this character. This loose fit of the valve is made possible because of its location in proximity to the reserve supply of gasoline and also because of the fact that the air vent is also located at the same level. This air vent determines the difference in the atmospheric pressure on the main body of the gasoline passing up through the lower end of the pipe 11 and the pressure in the pipe 11 above the air vent. In other words if the air vent is partly opened such as it would be practically with a loose fitting valve even when in its closed position, the air entering at the air vent, after the gasoline has passed below the level of the vent is not sufficient to admit full atmospheric pressure at this point and the result is that the atmospheric pressure in the tank will cause the gasoline to feed past the level of the air vent when the fuel will of course be subjected to the full atmospheric pressure. The most crudely made and fitting valve will work perfectly in this respect. Further it will be seen that any leakage in the valve will be "liquid sealed" by the main body of the gasoline before the reserve level is reached. As a matter of fact the air vent is normally open at this period and the gasoline is passing into the pipe 11 through the air vent as well as through the lower end of the pipe, except when the devices are adjusted to the cut off position in the constructions shown in Figures 6 and 7.

It will also be observed that there can be no leakage from the tank because of joints working loose and also that there are no joints outside of the tank that are constantly under gasoline pressure and liable to leak outside of the tank. The joint where the rod 5 passes through the cap 15 is a fibrepacked joint under spring control to take up all wear and this joint is only subjected to the splash of gasoline in the tank and not to any regular head or pressure of gasoline. As far as the valves 3 and 23 are concerned it makes no difference whether they leak or not as they are within the tank and any leakage falls back into the remaining supply of gasoline.

The peculiar construction of applicant's devices permits of very cheap and substantial manufacture because there are no close working or ground parts which have to fit just right or the parts are inoperative or leaky.

Having thus described my invention what I claim as new and desire to secure by Letters Patent is:

1. The combination with a fuel tank, of an unbroken feed pipe extending down into the same and having its lower end open and an air vent formed therein at a distance from its end, an oscillatory valve exterior of the pipe and capable of vertical movement for opening and closing the air vent, means for operating the valve extending up through the top of the tank and a packing surrounding said operating means where it passes through the tank to prevent the splash leaking out at this point.

2. The combination with a fuel tank, of a feed pipe extending down into the same and having its lower end open and an air vent formed therein at a distance from its end, an oscillatory valve to open and close the air vent and capable of free vertical movement and located wholly within the tank, a rod for operating the valve extending up through the top of the tank, a spring for normally forcing the rod in one direction, and a packing for the rod resisting this spring action 3. The combination with a fuel tank, of a feed pipe extending down into the same and formed with an air vent therein through which the fuel is also fed, a valve for opening and closing the air vent, and a screen for protecting both the open air vent and the open end of the pipe.

4. The combination with a fuel tank, of a feed pipe extending down into the same and formed with an air vent therein through which the fuel is also fed, a valve for opening and closing the open air vent, and a removable screen for protecting the air vent, and the open end of the pipe.

5. The combination with a fuel tank, of a feed pipe extending down into the same and having its lower end open and an air vent formed therein at a distance from its end, a valve for opening and closing the air vent and also completely cutting off the feed of the fuel when desired, located wholly within the tank and means for operating this valve from the exterior of the tank.

6. The combination with a fuel tank, of an unbroken feed pipe extending down into the same and having its lower end open and an air vent formed therein at a distance from its end, an oscillatory valve for opening and closing the air vent, a casing for the valve loosely surrounding the same, the valve and casing located exteriorly of the feed pipe and at about the level of the reserve supply in the tank, and means for operating the valve from the exterior of the tank.

7. The combination with a fuel tank, of a feed pipe extending down into the same, a casing having an air vent for the pipe, a reserve extension of the pipe, a valve in the casing at about the level of the reserve supply and arranged to open or close the air vent and to cut off the gasoline when desired, and means for operating the valve from the exterior of the tank.

8. The combination with a fuel tank, of a feed pipe extending down into the same and formed with an air vent, an oscillatory valve located wholly within the tank for opening and closing the air vent, said valve being capable of free vertical movement, a rod carrying the valve and extending through the top of the tank, and a spring actuated packing forced into position by longitudinal movement of the rod.

9. The combination with an unbroken fuel tank, of a fuel pipe extending down into the same and formed with an air vent near its lower open end, an oscillatory valve located exteriorly of the pipe and which closes the air vent more or less according to the degree of oscillation and thus changes the amount of the reserve supply, a rod for operating the valve passing through the top of the tank and means for packing the rod to prevent leaking at this point.

10. The combination with a fuel tank, of a fuel pipe extending down into the same and formed with an air vent near its lower open end, a valve casing around the air vent, a horizontally operating air valve for closing the air vent more or less and completely submerged by the main contents of the tank, and means for operating the valve from the exterior of the tank.

11. The combination with a fuel tank, of a fuel pipe extending down into the same and formed with an air vent at the desired reserve level normally covered by the main supply of fuel, a loose oscillatory valve located exteriorly of the pipe and which by its oscillation blocks and unblocks the air vent to allow more or less air to pass therein and thus deplete the reserve supply to a greater or less degree, and means for operating the valve from the exterior of the tank.

12. The combination with a fuel tank, of a fuel pipe extending down into the same and formed with an air vent at the desired reserve level normally submerged by the main supply of the fuel, a submerged oscillatory valve for blocking and unblocking the air vent by its oscillating movements but free to move vertically without becoming inoperative, a rod connected to the valve and passing through the top of the tank, a handle for operating the rod, a spring for moving the rod vertically, and a packing held in position by this vertical movement.

13. The combination with a fuel tank, of a fuel pipe extending down into the same and formed with an air vent at the desired reserve level normally covered by the main supply of the fuel, a valve for the air vent also submerged by the main supply of the fuel and formed to open, close and partly close the air vent and to completely cut off the fuel feed when desired.

14. The combination with an unbroken fuel tank, of a fuel pipe extending down into the same and formed with an air vent at the desired reserve level, a valve located exteriorly of the pipe for opening and closing the air vent, means for operating the valve from the exterior of the tank, a casing for the valve, and a screen secured detachably to the casing and covering both the open air vent and the lower open end of the pipe.

15. The combination with a fuel tank, of a fuel pipe extending down into the same and formed with an air vent, a valve introduced into the pipe at the desired reserve level and constructed to open the air vent, close it and entirely close the pipe when desired, and means for operating the valve from the exterior of the tank.

In testimony whereof I affix my signature in the presence of two witnesses.

WILLIAM H. MUZZY.

Witnesses:
ANNA M. GUENTHER,
M. ANDERSON.